United States Patent [19]
Smith et al.

[11] Patent Number: 5,539,175
[45] Date of Patent: Jul. 23, 1996

[54] APPARATUS AND PROCESS FOR OPTICALLY ABLATED OPENINGS HAVING DESIGNED PROFILE

[75] Inventors: Adlai H. Smith; Bruce B. McArthur, both of San Diego; Robert O. Hunter, Jr., Rancho Santa Fe, all of Calif.

[73] Assignee: Litel Instruments, San Diego, Calif.

[21] Appl. No.: 215,851

[22] Filed: Mar. 21, 1994

[51] Int. Cl.$^6$ .................................................... B23K 26/06
[52] U.S. Cl. ................................. 219/121.7; 219/121.71; 219/121.73
[58] Field of Search ............................ 219/121.7, 121.71, 219/121.61, 121.62; 156/643, 644; 250/492.1; 437/173, 187, 235, 935; 430/5; 427/596; 216/65

[56] References Cited

U.S. PATENT DOCUMENTS

| | | |
|---|---|---|
| 4,508,749 | 4/1985 | Brannon . |
| 4,684,436 | 8/1987 | Burns . |
| 4,734,558 | 3/1988 | Nakano et al. ............... 219/121.61 |
| 4,902,899 | 2/1990 | Lin . |
| 4,923,772 | 5/1990 | Kirch . |
| 5,223,693 | 6/1993 | Zumoto et al. ............... 219/121.68 |
| 5,293,025 | 3/1994 | Wang ............................ 219/121.71 |
| 5,294,567 | 3/1994 | Dortman et al. .................. 437/187 |
| 5,305,018 | 4/1994 | Schantz et al. ............... 219/121.71 |

OTHER PUBLICATIONS

Kawamura, K., et al. (Mar. 1982) "Effective deep ultraviolet photoetching of polymethyl methacrylate by an excimer laser", *Appl. Phys. Lett*, 40(5):374–375.

Srinivasan, R. et al. (Jul. 1982) "Self–developing photoetching of poly(ethylene terephthalate) films by far–ultraviolet excimer laser radiation", *Appl. Phys. Lett*, 41(6): 576–578.

Andrew, J. E., et al. (Oct. 1983) "Direct etching of polymeric materials using a XeCl laser", *Appl. Phys. Lett*, 48(8):717–719.

Dyer, P. E., et al. (Feb. 1985) "Excimer laser ablation and thermal coupling efficiency to polymer films", *J. Appl. Phys*, 57(4):1420–1422.

Braren, Bodil, et al. (May 1985) "Optical and photochemical factors which influence etching of polymers by ablative photodecomposition", *J. Vac. Sci. Technol.* B 3(3): 913–917.

Podlesnik, Dragan V., et al. (Feb. 1986) "Waveguiding effects in laser–induced aqueous etching of semiconductors", *Appl. Phys. Lett.* 48(7):496–498.

(List continued on next page.)

*Primary Examiner*—Geoffrey S. Evans
*Attorney, Agent, or Firm*—Townsend and Townsend and Crew

[57] ABSTRACT

A method and apparatus is disclosed for laser ablation of openings with a specified wall profile in materials such as polyimide. The method includes identifying the opening profile of choice. This profile of choice is then divided into convex portions which can be "stably" formed and concave portions which are "unstably" formed. With respect to convex portions of apertures, after ablation to their desired depth, these convex portions remain substantially unchanged with additional exposure to otherwise ablating radiation. With respect to concave portions of apertures, these concave portions change with additional exposure to ablating radiation. Accordingly, techniques are disclosed for controlling exposure to ablating radiation, controlling the profile of the ablating radiation, or both. In either case, the intensity profile of the working image containing the ablating light is shaped in accordance with the depth and slope of the sidewalls of the opening desired. Intensity of the working image is tailored across the opening to levels above the ablation threshold in accordance with the desired wall shape. Exposure to ablating radiation occurs with this exposure closely monitored only in the case of unstable concave profiles. The technique can be practiced with imaging systems or, preferably, practiced with masks containing computer generated holograms where light efficiencies are improved, sometimes by factors >1000. There results the ability to mass produce matrices of precisely shaped images by laser ablation.

19 Claims, 13 Drawing Sheets

OTHER PUBLICATIONS

Dyer, P. E., et al. (Aug. 1986) "Development and origin of conical structures on XeCl laser ablated polyimide", *Appl. Phys. Lett.* 49(8):453–455.

Srinivasan, R., et al. (Oct. 1987) "Ablation and etching on polymethylmethacrylate by very short (160 fs) ultraviolet (308 nm) laser pulses", *Appl. Phys. Lett*, 51(16):1285–1287.

Treyz, G. V., et al. (1988) "Rapid direct writing of high–aspect ratio trenches in silicon: Process physics", *J. Vac. Sci. Technol.* B6(1):37–44.

Srinivasan, R., et al. (Jul. 1989) "Ultraviolet Laser Ablation of Organic Polymers", *Chem. Rev.*, 89:1303–1316.

Lin, Burn, J. (Feb. 1992) "The Attenuated Phase–Shifting Mask", *Solid State Technology*, Jan.: 43–47.

APPARATUS AND PROCESS FOR OPTICALLY ABLATED OPENINGS HAVING DESIGNED PROFILE

This invention relates to imparting designed profile or shapes to optically ablated openings typically placed in substrates, such as nozzles utilized for ink jet printing heads. Specifically, a technique of intensity profiling a working image for ablating a designed profile to an opening in a substrate is disclosed. The technique can be utilized either with conventional imaging systems or preferably utilizes computer generated holographic images where high efficiency use of ablating light is realized. The process includes identifying certain stable "convex" opening shapes. These convex shapes have relative insensitivity to exposure beyond that exposure required for ablating the desired convex profiled opening to its full and intended contour. This results in tolerance for these holes to exposures of otherwise ablating radiation intensity beyond that required for their initial formation. Drilling of "concave" openings is also disclosed, it being disclosed that these concave openings are unstable with continuing exposure and therefore require close monitoring of ablating exposure. With concave openings, cessation of ablating exposure must occur once the full concave ablation profile of the aperture is reached.

BACKGROUND OF THE INVENTION

It is known to ablate openings with lasers in substrates.

First, contact masks are utilized. A mask is placed—usually by multi-step processes—over the substrate. The mask has opening windows for ablating light where openings are desired, and is otherwise opaque where openings are not desired. Light incident on the mask at the opening windows creates the required openings. When the mask is removed—usually by an etching step—the ablated openings in the substrate remain. The wall slope is difficult to control in general since there are no ready means for differentially varying the intensity profile across the opening.

Secondly, it is known to utilize laser illuminated masks and imaging objectives to project the pattern defined by the mask onto a substrate (such as polyimide) which is ablated. In the usual case, the imaging objective takes a relatively large mask and demagnifies it at the substrate with the result that the images of the openings to be ablated have the required (increased) intensity for ablation.

Various techniques have been used for creation of imaging masks. These techniques include multi-step etching processes, which processes can be repeated to create variant mask shading at differing locations on a single mask. Relatively complex partially transmissive and partially opaque patterns can be created but in dielectric coated masks, the number of transmission levels (gray levels) is limited by the number of process steps and alignments required in its manufacture. U.S. patent application Ser. No. 4,684,436 of Burns et. al. describes this fabrication process.

An example of a prior art system containing these elements can be found in Brannon et al. U.S. Pat. No. 4,508,749 issued Apr. 2, 1985. In the above reference, the ability to make "openings of positive slope" is set forth. Other than this statement, precision control of opening shape is not suggested or set forth.

A significant drawback of the above mentioned techniques is that they lack means for varying the intensity profile across the desired openings.

Another drawback of these techniques is that no means are specified for determining the intensity or fluence profile required at the workpiece for achieving the required wall shape.

Both contact mask and imaging systems are generally inefficient since many patterns of interest generally have $\leq 1\%$ of their area machined, so that in exposing the mask $\geq 99\%$ of the incident light is wasted.

It has also been known for some time that a broad class of industrially useful polymer films are ablated by the action of excimer laser light and that this ablation occurs at a certain threshold fluence $J_{th}$. That is, if the fluence, $J$, incident on the surface satisfies $J<J_{th}$ then there is no significant ablation while if $J>J_{th}$ there is significant ablation. "Ultraviolet Laser Ablation of Organic Polymers" by Srinivasan et. al. in *Chemical Reviews*, vol. 89, pg. 1303 summarizes much of the known science and phenomenology of polymer ablation. These observations have not previously been exploited for the purpose of determining desired wall profiles.

Stable structures in polyimide have been noted in the past. "Cone" structures were produced by Dyer et. al. in "Development and origin of conical structures on XeCl laser ablated polyimide", published in *Applied Physics Letters*, Vol. 49, No. 8, pg. 453 (1986). Particle contaminants on the surface or distributed within the volume of a polymer film produced stable conical structures when irradiated by light energy sufficient to cause ablation. These structures are stable in the sense that after a certain number of shots required for their formation, the resulting structure is immune to changes by further laser shots. According to Dyer et al., cones begin as either a low spot or null in the incident intensity pattern or debris obstructing the passage of light to a point on the polymer surface. After they are formed, their subsequent immunity to change by further laser shots is the result of their increased area over that of a flat surface and Fresnel reflectivity from the resulting sloped wall. It is important to note that there was no attempt to locally profile ablating light or control its local intensity in producing these "cones." Simply stated, the cones formed randomly in accordance with particulate dispersion and overall laser intensity applied.

SUMMARY OF THE INVENTION

A method and apparatus is disclosed for laser ablation of openings with a specified wall profile in materials such as polyimide. The method includes identifying the opening profile of choice. This profile of choice is then divided into convex portions which are "stable" and concave portions which are "unstable." With respect to convex portions of apertures, after ablation to their desired depth, these convex portions remain substantially unchanged with additional exposure to otherwise ablating radiation. With respect to concave portions of apertures, these concave portions change with additional exposure to ablating radiation. Accordingly, techniques are disclosed for controlling exposure to ablating radiation, controlling the profile of the ablating radiation, or both. In either case, the intensity profile of the working image containing the ablating light is shaped in accordance with the depth and slope of the sidewalls of the opening desired. Intensity of the working image is tailored across the opening to levels above the ablation threshold in accordance with the desired wall shape. Exposure to ablating radiation occurs with this exposure closely monitored only in the case of unstable concave profiles. The technique can be practiced with imaging systems or, preferably, practiced with masks containing computer generated holograms where light delivery efficiencies are improved, sometimes by factors >1000. There results the ability to mass produce matrices of precisely shaped images by laser ablation.

DESCRIPTION OF THE PREFERRED EMBODIMENT

It is known ("Ultraviolet Laser Ablation of Organic Polymers" by Srinivasan et. al., *Chem. Rev.* (1989), 1303–1316) that a number of commercially important polymers (polyimide being one) can be ablated with ultraviolet light. Ablation of polymers with ultraviolet light typically requires short (<1 μsec) pulses at moderate fluences (10–1000 millijoule/cm$^2$). One characteristic of polymer ablation is the existence of a fluence threshold, $J_{th}$, below which there is no significant ablation.

Experimental and theoretical work by us has determined that, in general, irradiation of polyimide with an appropriate fluence profile produces stable structures. That is, after a certain number of laser shots, a through hole will have formed in the polyimide and after another interval of shots, the resulting structure in polyimide will have stabilized in the sense that subsequent laser shots do not alter the via size or shape. The existence of these stable profiles for vias has not been noted hitherto.

One of the purposes of this invention is to exploit our observation of stable opening wall structures of the convex variety. In the case the desired opening wall structure has a convex profile application of the appropriate fluence profile results in the desired opening and, exposure to ablating radiation can occur within relatively wide tolerances.

Another purpose of this invention is to identify those unstable opening wall structures which include portions of the wall having concave configuration. In case the desired opening wall structure has an unstable profile, both applied fluence profile, the total quantity of ablating radiation, as well as the intensity of the ablating radiation can be adjusted so that the desired (unstable) opening wall structure is achieved.

In the following discussion, the reader will understand that a mask having traditional image information thereon—such as transparent, partially transparent, and opaque portions—or so-called holographic masks can be used. Also, high power phase masks such as those set forth in the co-pending application HIGH POWER MASKS FOR IMAGING SYSTEMS (Ser. No. 07/833,939, filed Feb. 10, 1992, now allowed) and APPARATUS AND PROCESS FOR THE PRODUCTION OF FINE LINE METAL TRACES (Ser. No. 08/058,906, filed May 6, 1993) can be used. In addition, direct phase mask machining as set forth in USE OF FRESNEL ZONE PLATES FOR MATERIAL PROCESSING, a Continuation-in-Part of Ser. No. 07/940,008 filed Sep. 3, 1992, which was a File Wrapper Continuation of Ser. No. 07/612,212 filed Nov. 9, 1990, now abandoned, and GENERALIZED GEOMETRIC TRANSFORMS FOR COMPUTER GENERATED HOLOGRAMS U.S. patent application Ser. No. 08/175,052, filed Dec. 29, 1993, can be used. Phase mask machining is the preferred mode of operation for this invention.

Determination of Design Fluence Profile for Convex Openings

In the following discussion, until notation is made to the contrary, wall profiles with convex construction will be discussed.

Figure 4:
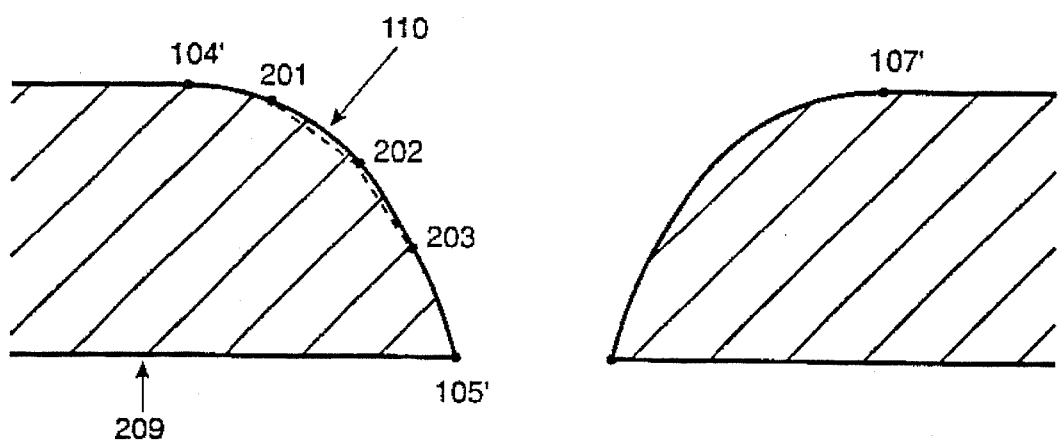
FIG. 4 is an expanded cross section of an opening.
Figure 5:
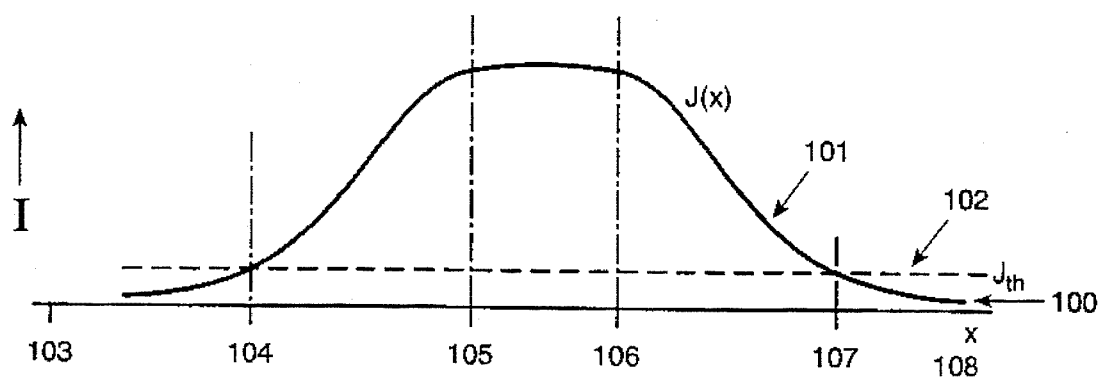
FIG. 5 is an expanded intensity profile.
Figure 6:
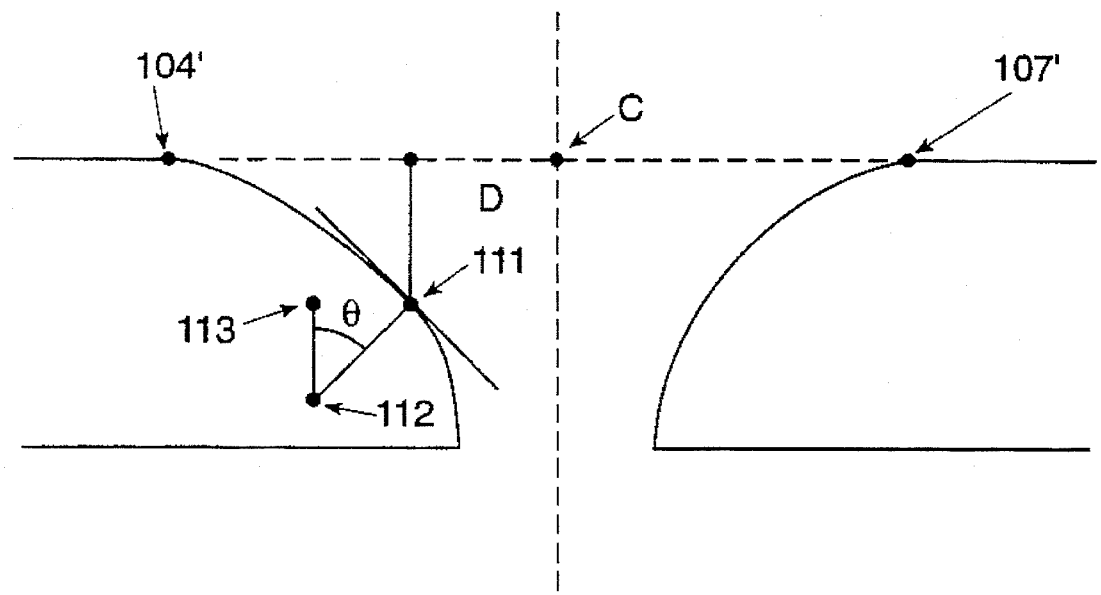
FIG. 6 is a diagrammatic representation of the rate of change of depth with respect to translational position so that coordinates for the designed intensity profiles can be further understood.
Figure 7:
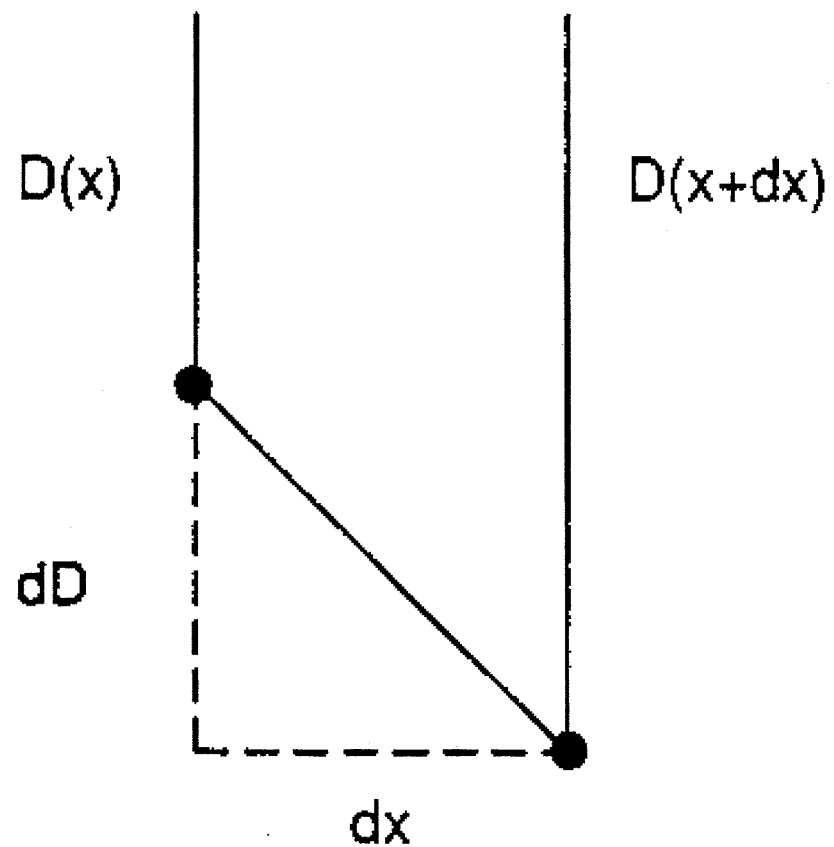
FIG. 7 is an illustration of a mathematical derivative dD/dx.

The following simple rule distinguishes convex hole openings from other openings. Referring to FIG. 4, a chord between any two points of the profile opening has all of its points interior to the ablated material. Thus chord 201–202 lies wholly inside of substrate 209, which is to be patterned. Chord 202–203 lies similarly inside.

Figure 11:
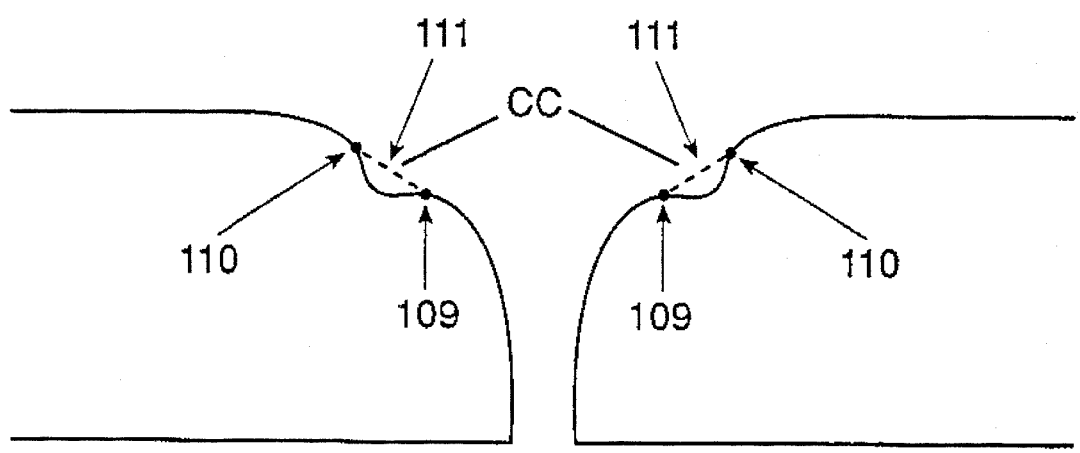
FIG. 11 is a profile of an aperture having an unstable "concave" portion to its profile, this profile possibly being produced by an ablation profile similar to that illustrated for FIG. 10 with the secondary maxima extending above the ablation threshold.

This can be contrasted with the example shown in FIG. 11. Specifically, the wall shape there shown has a portion with a reversed slope found between inflection points 110 and inflection point 109 of the illustrated profile. It can be seen that broken straight line 111 connecting the respective inflection point 109 and inflection point 110 extends outside ablated material. This opening therefore is not convex.

We now discuss in detail the determination of the fluence profile required to produce a desired opening shape. This technique requires that the substrate be known and have a fluence threshold $J_{th}$. Furthermore, its complex index of refraction, ñ, must be known. $J_{th}$, ñ, both depend on the wavelength of the ablating light. Examples of substrates which cleanly ablate and have fluence thresholds are polyimide, benzocyclobutene (BBQ), polyphenylquinoxalines (PPQ's), polymethylmethacrylate (PMMA), and other polymers. In addition to polymer materials, this invention can be practiced on any other substrate which has a fluence threshold for ablation and significantly ablates above the fluence threshold. As described below, the technique applies to 1 dimensional linear or cylindrically symmetric wall profiles created with unpolarized incident light. The generalization to arbitrary wall profiles and polarized incident light is straightforward but tedious and will not be explicitly given here but can readily be derived based on the considerations discussed herein.

In the following specification, we are going to set forth, utilizing the convenience of mathematical equations, a way to predict the profiles. Before this is done, we outline herewith the steps that can be utilized in obtaining openings having designed profiles.

First, the profile of the opening is selected. Where the profile is convex, it will be possible to develop a fluence profile that at the end of a predictable number of individual laser shots will give the selected hole and further shots will not significantly affect the size or shape of the opening. Alternately, the selected hole can include a concave portion. If this is done, the total number of laser shots will have to be carefully monitored. The laser dosage will have to cease at that time the profile reaches the desired and selected hole shape.

The material of the substrate will have to be selected. Further, a light source of known spectral composition will have to be utilized. Normally this light source will be temporarily coherent—but it can be polychromatic.

Once this is done, it then becomes necessary to determine complex refractive index of the substrate for the light source.

Having chosen the substrate and light source, the ablation threshold can be determined as well as the rate at which etching occurs at fluences above the ablation threshold.

Thereafter, the particular profile of the working image can be determined as it relates to incident fluence on the substrate.

Stopping here, and considering the case of the convex wall profiles of openings in substrates, it is important to realize that our discovery that some profiles can be stably formed is important. By the selection of aperture wall profiles of the described convex character, wide latitude in dose tolerance is achieved after the convex wall profiled aperture is attained. This will impart high accuracy and reproducibility resulting in high production yields to any ablation process utilizing such apertures. Hence the term "stable" is sometimes applied to these wall profiles.

We now proceed to a mathematical enablement of these steps set forth above.

Definition of Symbols

In the foregoing, the following symbols take on the following meanings;

$J(x)$=fluence profile creating the desired opening shape as a function of position, $x$, this function is to be determined by the analysis.

$D^*(x)$=desired depth profile as function of position $x$.

$D(x,n)$=depth profile after $n$ shots, $D(x,0)=0$.

$$\tan\theta = \left|\frac{dD}{dx}\right| = \text{the local wall angle.}$$

$R(\cos\theta)$=polarization averaged Fresnel Reflectivity, depends on the complex refractive index, $\hat{n}$.

$$T(\cos\theta) = \cos\theta \frac{1-R(\cos\theta)}{1-R(1)} = \text{effective transmission coefficient (into material at normal incidence).}$$

$\dot{E}[J]$=etch rate at fluence $J$.

Near the fluence threshold we have $$\approx c\left(\frac{J}{J_{th}} - 1\right) \quad J > J_{th}$$
$$0 \quad J < J_{th}$$

and in polyimide at 248 nm the constants $c$ and $J_{th}$ are approximately $c=0.0623$ μm $J_{th}=0.027$ J/cm².

$J_{th}$=threshold fluence.

$\hat{n}$=complex refractive index, $\hat{n}\approx 1.5+0.4i$ in polyimide @248 nm.

Assuming a convex opening, given some fluence profile $J(x)$, the depth profile evolves shot by shot according to the following differential-difference equation:

$$D(x,n) = \frac{\dot{E}[T(\cos\theta)J(x)]}{\cos\theta} + D(x,n-1) \quad (1)$$

$$\tan\theta = \left|\frac{\partial D(x,n-1)}{\partial x}\right|. \quad (2)$$

These equations can be combined to give;

$$D(x,n) = D(x,n-1) + \frac{\dot{E}\left[J(x)T\left(\cos\tan^{-1}\left|\frac{\partial D(x,n-1)}{\partial x}\right|\right)\right]}{\cos\tan^{-1}\left|\frac{\partial D(x,n-1)}{\partial x}\right|} \quad (3)$$

Figure 8A:
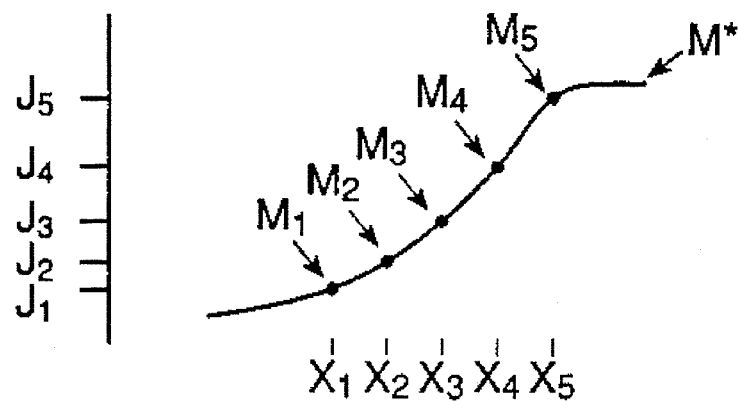
FIG. 8 is a plot of successive laser pulses ablating material with the result of a convex profile being formed.
Figure 8B:
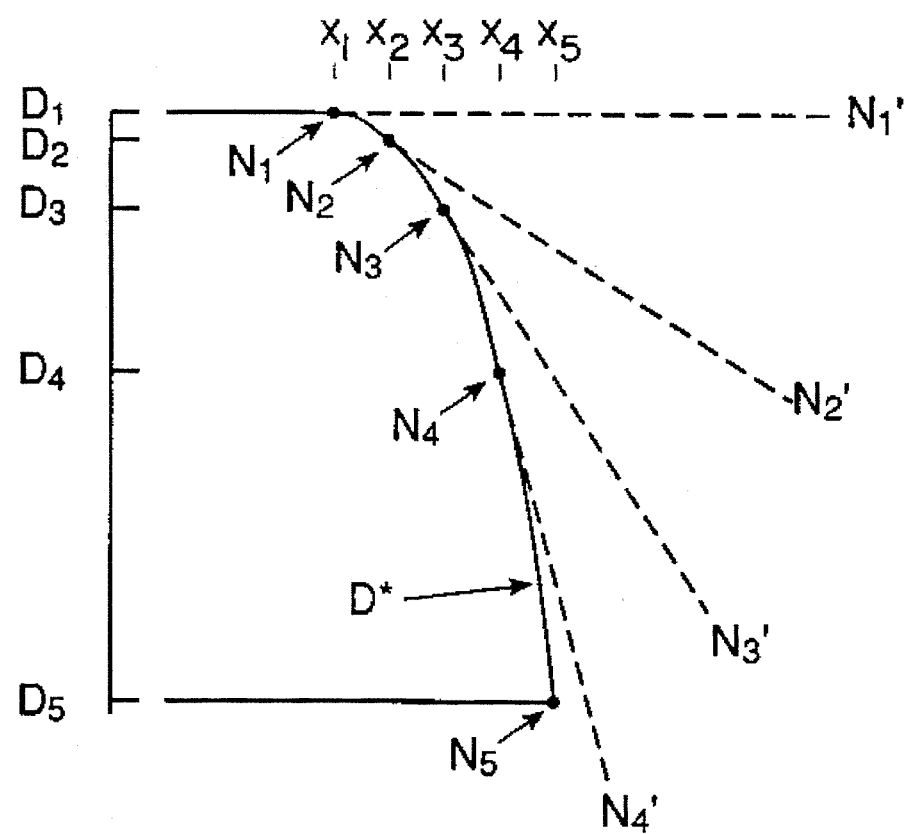

These equations describe the evolution of the depth profile from shot $n-1$ to shot $n$. The fluence profile is determined as a cubic spline which is continuous and has continuous first derivatives. The spline coefficients as well as the mesh point locations are determined from the calculation. Referring to FIG. 8, desired depth profile $D^*$ is created by fluence profile $M^*$.

The pulse by pulse evolution of $D^*$ is as follows. Initially the surface $N_1$-$N'_1$ is flat. Then, after the first shot it takes on the form $N_1$-$N_2$-$N'_2$. Position $x1$ denotes the edge of the opening, as such the fluence applied at this point is equal to $J_{th}=J_1$. The fluence is increasing at point M1 so that after 1 shot, the depth profile is the curve $N_1$-$N_2$-$N'_2$. At point $N_2$, the slope of the depth profile is such that even though the fluence profile has increased to the value $J_2>J_1$, further shots will not further erode $N_2$. $J(x)$ is expressed as a cubic spline in the interval $x1$ to $x2$ as;

$$J(x) = J_1 + \dot{J}_i(x-x_1) + \ddot{J}_1\frac{(x-x_1)^2}{2} + \dddot{J}_1\frac{(x-x_1)^3}{6} \quad (4)$$

where the various coefficients can be solved for to get;

$$J_1 = J_{th} \quad (5)$$

$$\dot{J}_1 = \frac{\dot{D}^*}{\frac{\partial \dot{E}}{\partial J}\bigg|_{J_1}}$$

-continued $$\ddot{J}_1 = \frac{\ddot{D}*}{\frac{\partial^2 E}{\partial J^2}\bigg|_{J_1}}$$

$$\dddot{J}_1 = \frac{\dddot{D}*}{\frac{\partial^3 E}{\partial J^3}\bigg|_{J_1}}$$

where $\dot{D}*, \ddot{D}*, \dddot{D}*$ are the 1st, 2nd and 3rd derivatives of the desired depth profile evaluated at position x1 with equations (5) yielding the rates of change of the fluence profiles necessary to obtain the desired shapes. The point at which this spline interval for J(x) ends is determined by the condition that its endpoint has an effective fluence equal to the threshold fluence $J_{th}$. As an equation this is $$T\left(\cos\tan^{-1}\left|\frac{\partial D(x,1)}{\partial x}\right|\right)\left(J_1 + \dot{J}_1(x-x_1) + \ddot{J}_1\frac{(x-x_1)^2}{2} + \dddot{J}_1\frac{(x-x_1)^3}{6}\right)\bigg|_{x=x_2} = J_{th} \quad (6)$$

Having determined J(x) in the interval x1-x2, we now proceed to the next interval. To keep the discussion in general, we describe how this solution process works in determining the fluence profile in the interval $x_{n-1}$-$x_n$. The fluence profile, J(x), is described in the aforementioned interval by a cubic spline:

$$J(x) = J_n + \dot{J}_n(x-x_n) + \ddot{J}_n\frac{(x-x_n)^2}{2} + \dddot{J}_n\frac{(x-x_n)^3}{6} \quad (7)$$

where the quantities are determined by continuity from:

$$J_n = J_{n-1} + \dot{J}_{n-1}(x_n - x_{n-1}) + \ddot{J}_{n-1}\frac{(x_n-x_{n-1})^2}{2} + \dddot{J}_{n-1}\frac{(x_n-x_{n-1})^3}{6} \quad (8)$$

$$\dot{J}_n = \dot{J}_{n-1} + \ddot{J}_{n-1}(x_n - x_{n-1}) + \dddot{J}_{n-1}\frac{(x_n-x_{n-1})^2}{2} \quad (9)$$

and $\ddot{J}_n$, $\dddot{J}_n$ are to be determined.

The depth profile in this interval is described by a quadratic spline $$D(x,n) = D_n + \dot{D}_n(x-x_n) + \ddot{D}_n\frac{(x-x_n)^2}{2} \quad (10)$$

where the quantities $D_n$, $\dot{D}_n$ are determined by continuity through first derivatives as $$D_n = D_{n-1} + \dot{D}_{n-1}(x_n - x_{n-1}) + \ddot{D}_{n-1}\frac{(x_n-x_{n-1})^2}{2} \quad (11)$$

$$\dot{D}_n = \dot{D}_{n-1} + \ddot{D}_{n-1}(x_n - x_{n-1}) \quad (12)$$

and the second derivative is determined by the corresponding second derivative of the desired profile as:

$$\ddot{D}_n = \frac{\partial^2 D*(x)}{\partial x^2}\bigg|_{x=x_n} \quad (13)$$

What remains to be determined are the quadratic and cubic coefficients $\ddot{J}_n$, $\ddot{e},\overline{dot}$ $\dddot{J}$+ee $_n$. This is done by assuming values for them and then computing D(x,n) by recursive application of eq. 3 and subsequently fitting D(x,n) to a quadratic function;

$$D(x,n) = D_n + A_n(\ddot{J}_n, \dddot{J}_n)(x-x_n) + B_n(\ddot{J}_n, \dddot{J}_n)\frac{(x-x_n)^2}{2} \quad (14)$$

$\ddot{J}_n,+\ddot{e},\overline{dot}$ $\dddot{J}$+ee $_n$ are then determined by solution of the set of simultaneous equations:

$$\dot{D}_n = A_n(\ddot{J}_n,+\ddot{e},\overline{dot}\ \dddot{J}+ee\ _n) \quad (15)$$

$$\dot{D}_n = B_n(\ddot{J}_n,+\ddot{e},\overline{dot}\ \dddot{J}+ee\ _n) \quad (16)$$

Figure 9:
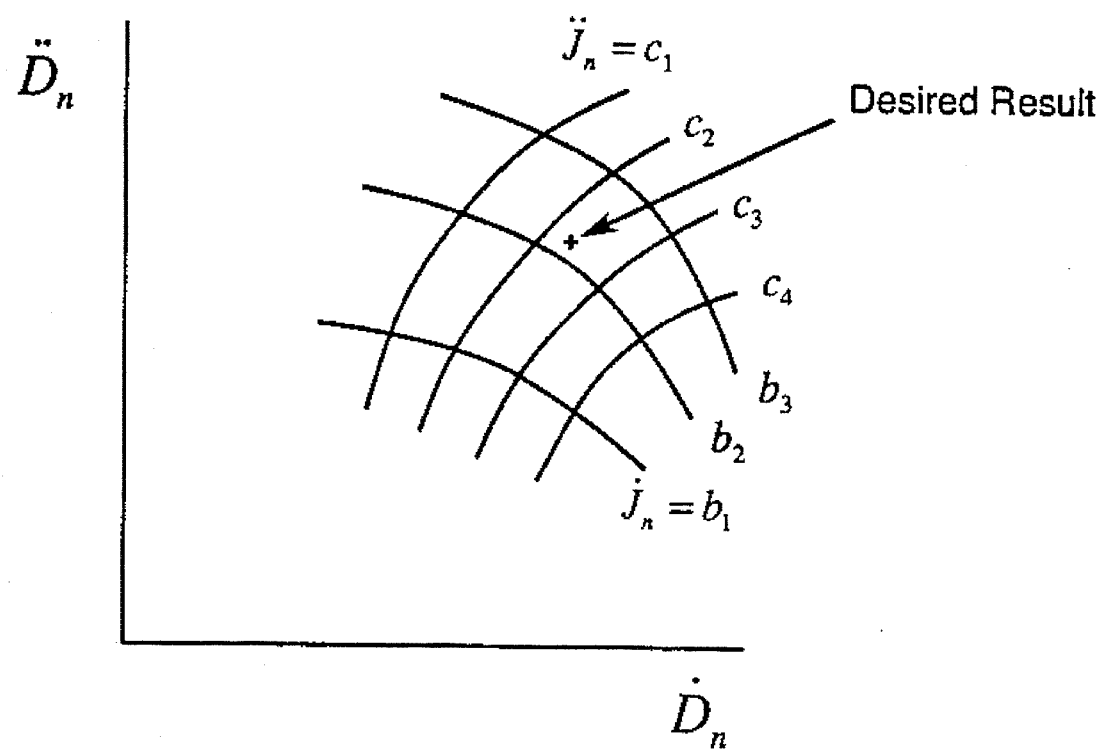
FIG. 9 plots the first and second derivatives of the achieved opening profile as a function of the second and third derivatives of the local fluence profile.

Equations 15 and 16 can be solved by numerical methods such as gradient descent, fisherman's net, or other standard algorithms. FIG. 9 illustrates the fisherman's net algorithm. The parameters $\ddot{J}_n$, $+\ddot{e},\overline{dot}$ $\dddot{J}$+ee $_n$ are varied and the results $A_n$, $B_n$ are plotted as in FIG. 9. From the results, the desired solution point can be interpolated or further refined with a finer meshed 'net' of values.

To evaluate the coefficients of equation 14, D(x,n) is calculated at 6 points, $x_n$, $x_a$, $x_b$, and at points incremented from them by a small distance $\epsilon$. The diagram below illustrates the location of these evaluation points. This calculation uses equation 3 iteratively.

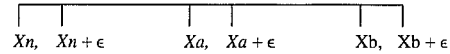

Having determined $\ddot{J}_n$, $+\ddot{e},\overline{dot}$ $\dddot{J}$+ee $_n$ it remains to determine $X_{n+1}$. This is done by successively incrementing $X_n$ until we satisfy $$T\left(\cos\tan^{-1}\frac{\partial D(x,n)}{\partial x}\right)\left(J_n + \dot{J}_n(x-x_n) + \ddot{J}_n\frac{(x-x_n)^2}{2} + \dddot{J}_n\frac{(x-x_n)^3}{6}\right)\bigg|_{x=x_{n+1}} = J_{th} \quad (17)$$

Figure 10:
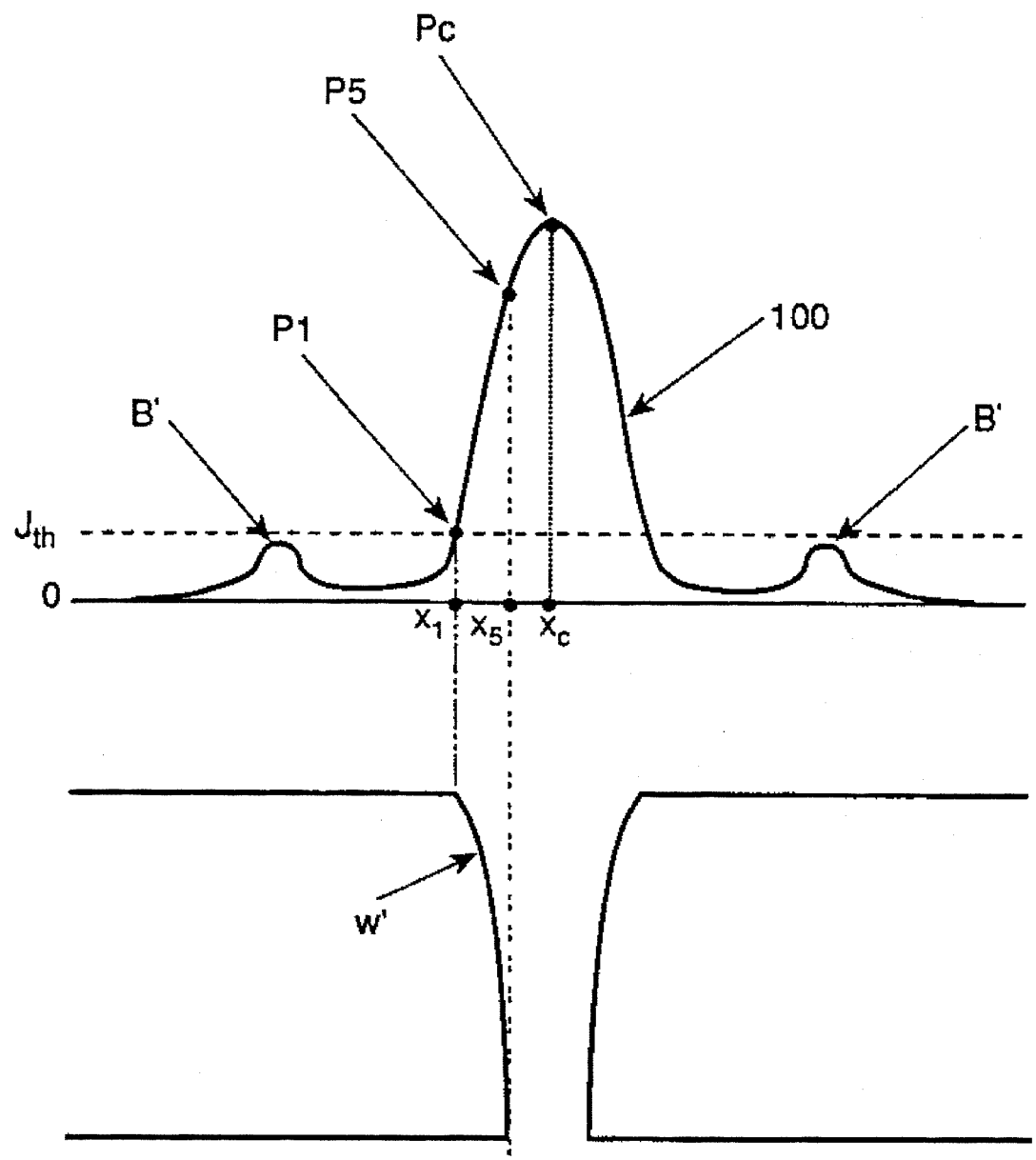
FIG. 10 illustrates a stable convex wall shape and a fluence profile.

Returning to FIG. 8, we can now explain the evolution of the depth profile with increasing shot number. Before the first shot, the depth profile, $N_1$-$N'_1$ is flat. After the first shot it takes the form $N_1$-$N_2$-$N'_2$. Along segment $N_1$-$N_2$ the fluence profile is stable in that subsequent shots do not alter its shape, but segment $N_2$-$N'_2$ is altered by subsequent shots. After the second shot the depth profile is $N_1$-$N_2$-$N_3$-$N'_3$ and the segment $N_1$-$N_2$-$N_3$ is stable with segment $N_2$-$N_3$ being formed by this shot. This process is repeated until the desired depth profile has been determined in a finite number of shots. The resulting profile is immune to change by subsequent laser shots; hence the use of the term stable. To the left of point N, the fluence profile is chosen so that it is continuous through 1st derivatives but is otherwise chosen so it rapidly decreases to 0. Since in this region the incident fluence will be below threshold, its exact form is not critical; however consideration of the effects of fluctuations in the overall fluence level might further constrain the profile in this regime; in particular, convexity of the fluence profile is desirable in the vicinity of $N_1$ but further away, this need not hold. Since the part on the mask (phase mask or imaging mask) responsible for producing the desired fluence profile generally has finite support, (the region responsible for forming the fluence profile extends only over a limited part of the mask) the resulting fluence profile generally extends over a theoretically infinite area on the workpiece. Sidelobe structure of the incident fluence profile is a typical characteristic of such finite support imagery. While the magnitude and extent of the sidelobes can be reduced or largely eliminated with such techniques as phase shifting for imaging masks (for a general review see "The Attenuated Phase-Shifting Mask", by B. Lin, in *Solid State Technology*, January 1993, pg. 43) or backpropagation for phase masks ("Use of Fresnel Zone Plates for Material Processing", B. MacDonald et al.) this is not always possible, and when it is it always results in more complex masks. However if the mask can be designed to produce the desired fluence profile in the region where it is $>J_{th}$, then the side lobe structures will not affect the ablated profile. This is illustrated by FIG. 10 where fluence profile 100, is determined by the aforementioned method in the region from point $x_1$–$x_5$ (or $P_1$ to $P_5$) where there is a specified wall slope. The region from $x_5$ to $x_c$ (or P5 to Pc) is determined as a single segment of a cubic spline, continuous through 1st derivatives at $P_5$, being convex overall, having vanishing 1st derivative at $x_c$, and having minimum total fluence at point $P_c$. The only constraint on the region to the left of $x_1$ is continuity at $x_1$ through 1st derivatives and that it overall always be less than $J_{th}$. In this case, a finite support region in the mask plane creates this fluence profile; that is why there are side lobes, B' and also why the profile is spread out beyond the confines of the desired wall profile W'. Since the wall profile is symmetric, the right half of the fluence profile is automatically determined.

Physical Limitations and Extensions of the Model

The physical model used in deriving the prescription for a fluence profile assumes that the ablation threshold is very sharp and that absolutely no material removal occurs at fluences below it. As discussed in "Direct Etching of Polymeric Materials Using a XeCl Laser" by J. E. Andrew et al. in *Applied Physics Letters* Vol. 43, No. 8, pg. 717–19 (October 1993), the threshold fluence refers to the threshold for significant ablation only. At fluences below threshold there is some material removal but it is typically small. Thus, in the above mentioned reference, the ablation threshold for polyethylene terephthalate (PET) at a wavelength of 308 nm was measured as 0.17 J/cm$^2$, its ablation rate at 0.05 J/cm$^2$, one third of the threshold fluence, was measured at <0.0001 micron.

Funneling of Light

The above mentioned model neglects the fact that the light reflected off of the wall is incident next on the hole bottom or the opposite wall face. This funneling of light down the length of the bore was previously noticed by B. Braren et al. in "Optical and Photochemical Factors which Influence Etching of Polymers by Ablative Photodecomposition", *Journal Vacuum Science and Technology*, B3 (3), Pg. 913 (1985). This effect is most pronounced at high wall angles (>60°) so the wall profiles generated using the fluence profiles produced using the above techniques will tend to be steeper than desired, however for openings created at depth-:diameter ratios <2:1, the above mentioned technique should be sufficiently accurate. At greater depth:diameter ratios, the procedure above can be modified to take the reflected light into account. This complicates the calculations since the reflected light is now polarized and the state of polarization influences the surface reflectivity, but this is required at larger depth:diameter ratios if accurate profiles are desired.

Polarized Light

So far we have considered only openings generated using unpolarized light. Unpolarized incident light is of greatest practical importance when the desired openings are circular since in combination with circularly symmetric ablation profiles it leads to circular openings. Polarized light can also be used for creating openings. The simplest configurations are long trenches having a constant desired wall profile. Some effects of polarization on wall slope in this geometry have been observed in the context of chemically assisted laser etching of semiconductor materials by G. Treyz. et al. in "Rapid Direct Writing of High-Aspect Ratio Trenches in Silicon: Process Physics" in *Journal Vacuum Science and Technology* B 6(1), pg. 37. The adaptation of the above technique would involve only changing the Fresnel reflection coefficients $R(\cos(\theta))$ to correspond to the light's incident polarization state.

Non Symmetric Holes

The methods described above apply explicitly to 1-dimensional profiles, trenches or cylindrically symmetric openings. Generalization to 2 dimensional profiles requires that the quadratic and cubic splines be recast as 2-dimensional finite element structures and the subsequent calculations be carried out accordingly.

Constant Energy and Shape of Profile

The above considerations assume that the overall fluence level is constant from shot to shot. In practice it will vary over some range, the effect on wall shape can be modeled using Monte Carlo techniques, and the limits set on the allowable statistical variation in incident fluence, for producing desired wall profiles.

Unstable Profiles

So far we have been concerned with generating wall profiles which after a certain period of irradiation during which time they are formed and are unaffected by subsequent irradiation. This stability of wall profile is necessary for situations (such as in loosely regulated scanning of a phase or imaging mask) where the number of shots delivered to any given opening is somewhat unpredictable or falls within a range of values. There are, however, situations where the number of shots delivered to each opening is tightly controlled. One example is projection imaging arrangements where the light is incident on the entire region of interest on the imaging mask is simultaneous, hence controlling the number of shots is trivial. Another example is a phase mask designed so that it consists of discrete regions which are scanned separately, and during the course of each scanning step, the entire region is always illuminated. Under these circumstances, and others, unstable as well as stable wall profiles can be patterned.

An unstable wall profile is one that changes with subsequent shots. In general, any profile with concave wall slope is unstable. Thus, in the wall profile of FIG. 11, the portion of the profile between points 109 and 110 are concave and hence will change with further laser shots. This wall profile could be generated by the fluence profile of FIG. 10 in a definite number of shots if the overall fluence level is raised until the fluence on side lobes B' are above the threshold fluence. Another technique for creating the wall profile of FIG. 11 would be to use the fluence profile of FIG. 10 at a higher overall level so that concave portions CC are formed and then switch the overall fluence level so that the concave portions CC are not further ablated and the exit hole portion is stably formed.

Figure 12:
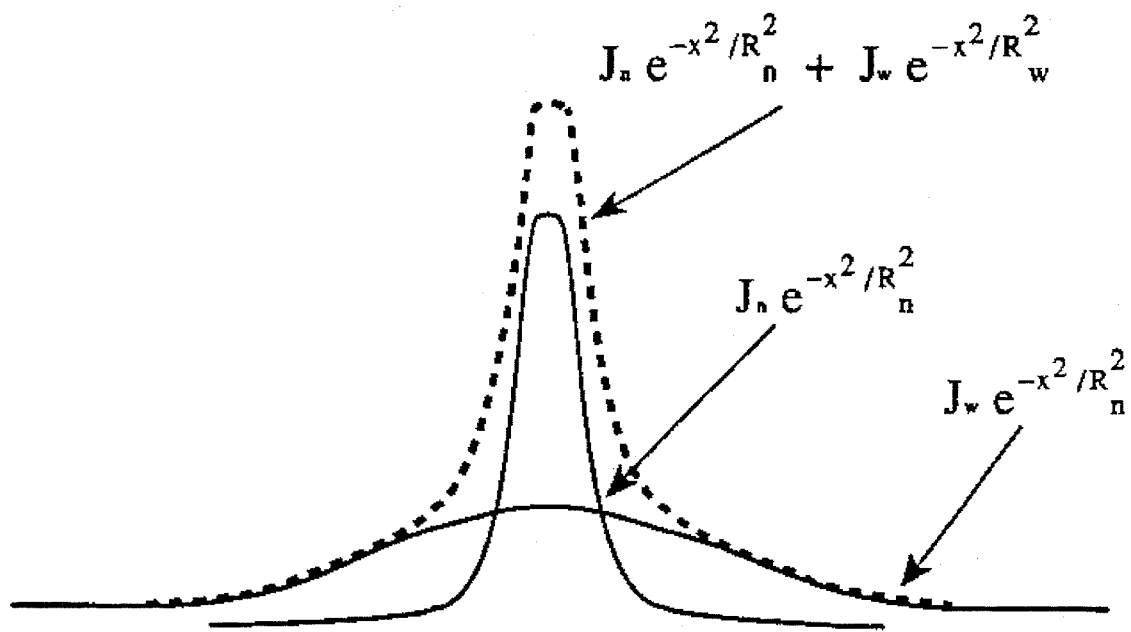
FIG. 12 illustrates a fluence profile which is the sum of two Gaussian fluence profiles.

Another technique for determining the fluence profile and number of shots required to generate a desired unstable profile is variation of parameters. This technique involves parametrically defining a class of fluence profiles and then varying those parameters and the number of shots until the desired wall shape is found. Standard numerical techniques such as gradient descent can be used to determine the best parameter set. An example of a parametrically determined fluence profile is FIG. 12. A narrow Gaussian $J_n e^{-x^2/r_n^2}$, and a wide Gaussian, $J_w e^{-x^2/r_w^2}$, are added together to form a composite fluence profile. The parameters varied are the fluence coefficients, $J_w, J_n$ and the two widths, $r_w$, $r_n$.

Technique for use with Polychromatic Light

Figure 13:
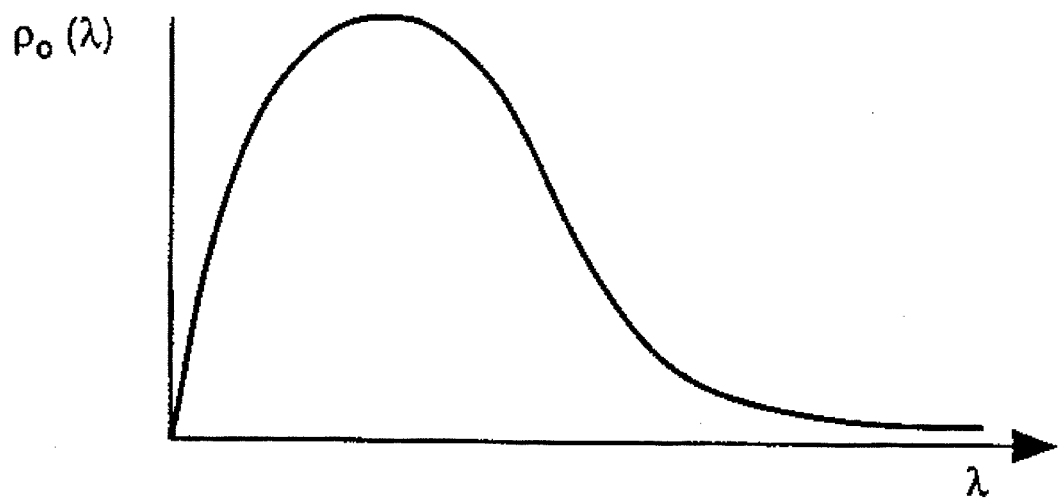
FIG. 13 illustrates the spectral characteristics of a light source used in the apparatus for creating the desired nozzle openings.

So far we have discussed the method of designing the fluence profile as it would be applied to light with a definite wavelength $\lambda$. The method, however, can also be used with more general polychromatic sources. FIG. 13 illustrates a polychromatic spectrum, in this case a blackbody spectrum. $\rho_0(\lambda)\, d\lambda$ is proportional to the amount of energy in the spectrum between $\lambda$ and $\lambda+d\lambda$ and the normalization is $1=\int \rho_0(\lambda)d\lambda$. Typically, the raw source output spectrum would have its spectral range restricted for ease of optical handling. Next, the ablation rate in the substrate of interest would be determined by experiment, the result being expressed as an ablation rate, $\dot{E}(J)$, at fluence J, at normal incidence to the substrate. Knowing $\dot{E}(J)$ implies knowledge of the threshold fluence $J_{th}$. Then either the complex refractive index, $\tilde{n}(\lambda)$, would be determined as a function of wavelength over the spectral range of the source, or the Fresnel reflection coefficients would be measured as a function of incident angle and polarization using the intended source. If the latter method is used, we immediately know the effective Fresnel reflection coefficients $R(\cos(\theta))$ while if the former method is used, the effective Fresnel reflections can be computed via; $R(\cos(\theta)) \rightarrow \int d\lambda \rho_0(\lambda) R(\cos(\theta), n(\lambda))$ where $R(\cos(\theta), n(\lambda))$ is the monochromatic Fresnel reflection coefficient at wavelength $\lambda$. One additional fact is that if light funneling is significant and the contribution of once or multiply reflected light must be taken into account, then not only the polarization but the spectral characteristics of the reflected light will differ from the incident light so that this must be taken into account. However, armed with a suitable characterization of both light source and material, fluence profiles which create desired wall slopes can be determined.

Application of Technique to Imaging Systems

Figure 1:
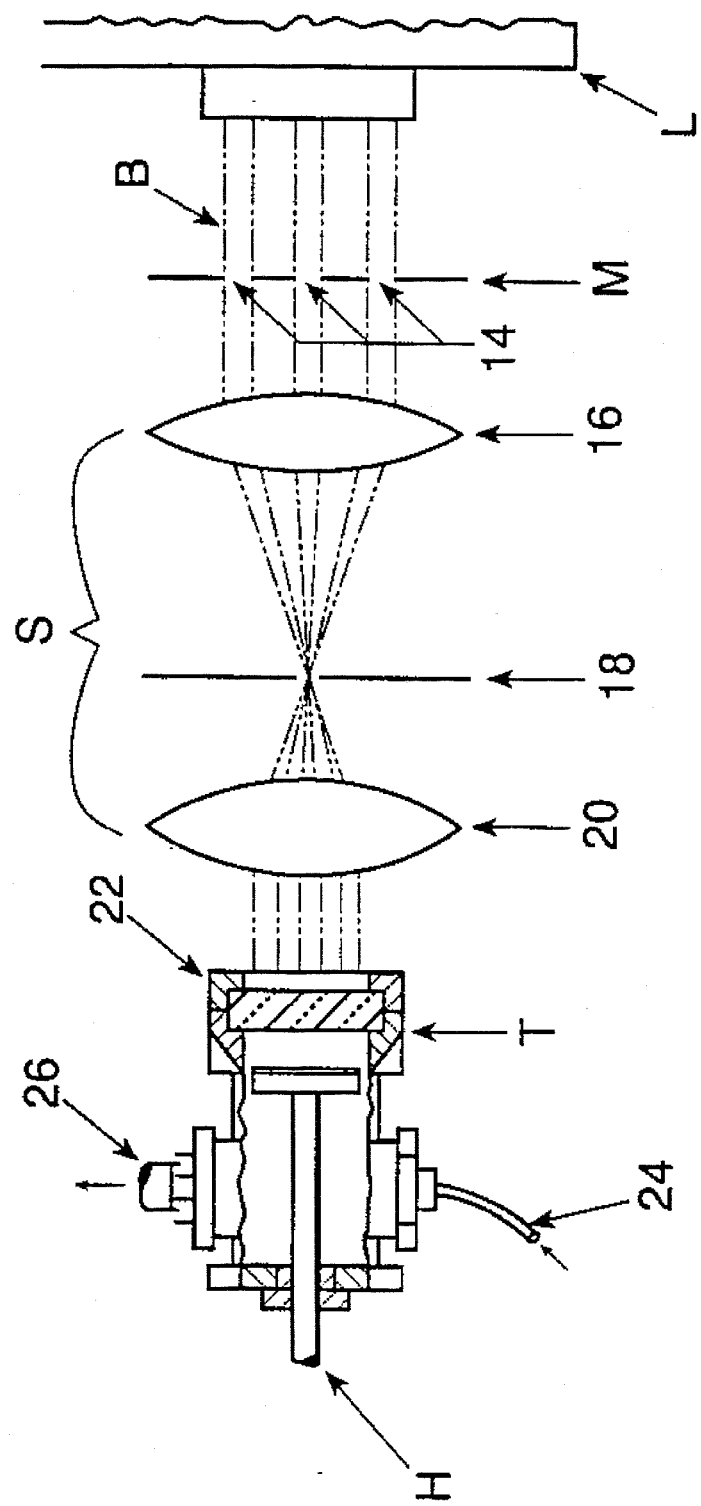
FIG. 1 is a prior art illustration of a system utilizing a laser, mask, lens train, and substrate holder for ablating openings in a substrate, the substrate holder here utilizing a vacuum chamber.

Referring to FIG. 1, a prior art system for ablating openings in a substrate is illustrated—this prior art system being that illustrated in the second figure of Brannon et al. U.S. Pat. No. 4,508,749 issued Apr. 2, 1985. Laser L emits a collimated beam B which impinges upon mask M containing openings 14.

The openings 14 are then relayed by lens system S to substrate T contained within holder H. Specifically, first lens 16, pin hole opening 18, and second lens 20 produce an image reduction on the order of 5 times. This reduction increases the intensity of images of openings 14 on substrate T to a sufficient level to realize ablation of openings on substrate T. As is apparent, substrate T is contained within holder H on the opposite side of quartz window 22 in a controlled atmosphere provided by gas supply conduit 24 and gas discharge conduit 26. Ablation on substrate T occurs. This much is set forth in the prior art.

It will be understood that mask M illustrated in FIG. 1 is shown with simple images of openings 14 shown therein. As will hereafter become apparent, a mask M having areas of varying transmission or "gray" levels is required for the practice of this invention. The reader will understand that it is the intent of this disclosure to set forth apparatus and process by which such a mask M has its transmission profile designed for the purpose of obtaining desired wall profiles. Once the design and limitations of the mask is known, then with respect to the embodiment of FIG. 1, prior art techniques can be used to place optical elements on the mask M to achieve the required image. For example the methods set forth in HIGH POWER MASKS FOR IMAGING SYSTEMS (Ser. No. 07/833,939, filed Feb. 10, 1992, now allowed) and LITHOGRAPHIC PROCESS HAVING IMPROVED IMAGE QUALITY (U.S. Pat. No. 4,902,899 issued Feb. 20, 1990 to Lin et al.) can be used for purposes of creating the desired gray level mask. As another example, use can be made of that technique set forth in Burns et al. U.S. Pat. No. 4,684,436 entitled "Method of Simultaneous Etching Personality and Select" issued Aug. 4, 1987.

Application of Technique to Phase Mask Machining Systems

Figure 2:
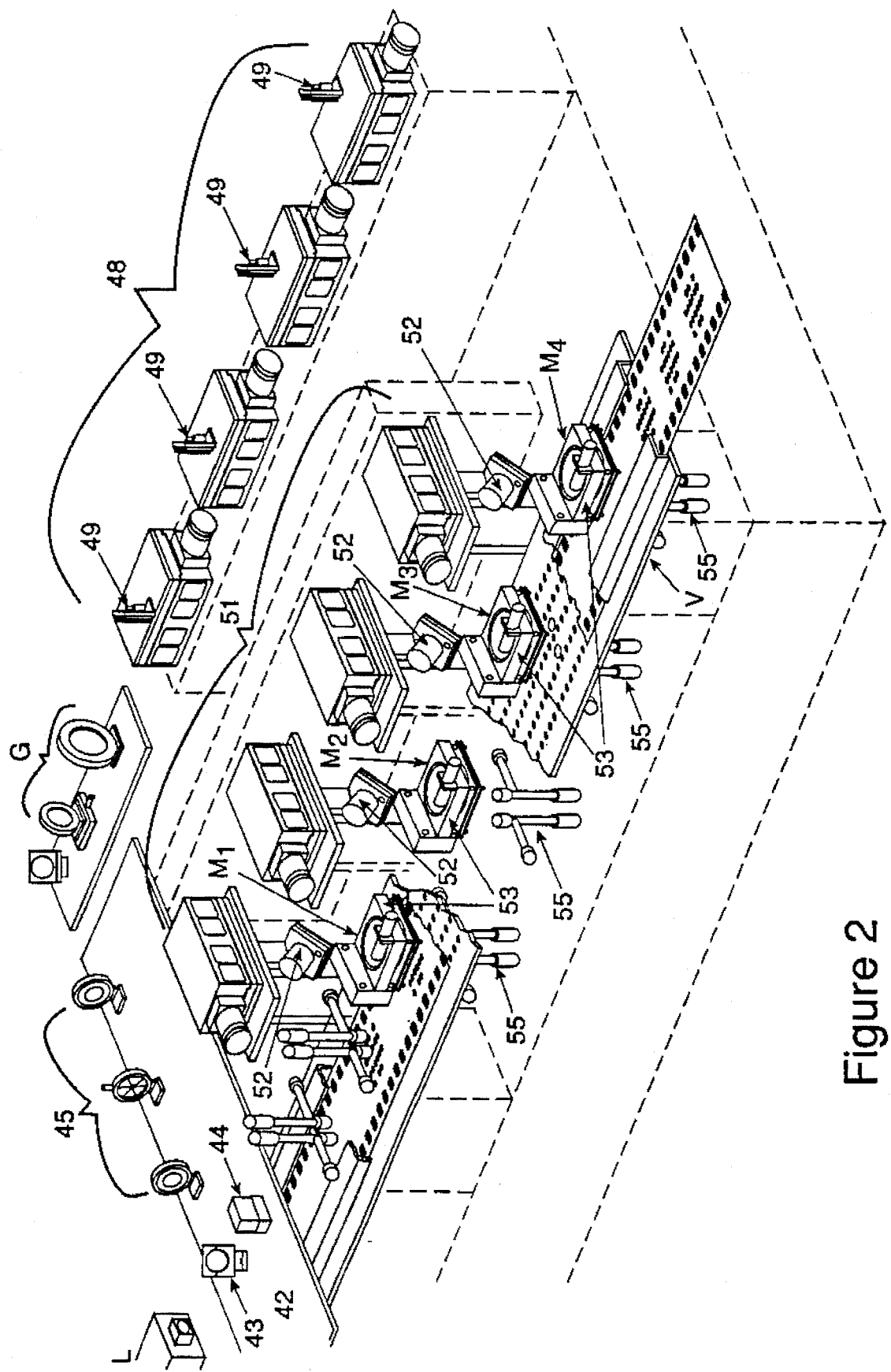
FIG. 2 is an illustration of a laser and multiple mask system utilizing computer generated holographic images on the multiple masks for ablation of openings in a substrate.

Another preferred embodiment utilizes scanned masks containing computer generated holograms. FIG. 2 contains an illustration of such apparatus.

Referring to FIG. 2, an apparatus appropriate for processing discrete parts or small scale reel handling is illustrated.

The apparatus set forth in FIG. 2 and other related techniques are set forth and described in U.S. patent application Ser. No. 08/177,108, filed Jan. 3, 1994, entitled "Apparatus and Process for Nozzle Production Utilizing Computer Generated Holograms" by the inventors herein. This co-pending application is incorporated herein by reference.

Figure 3A:
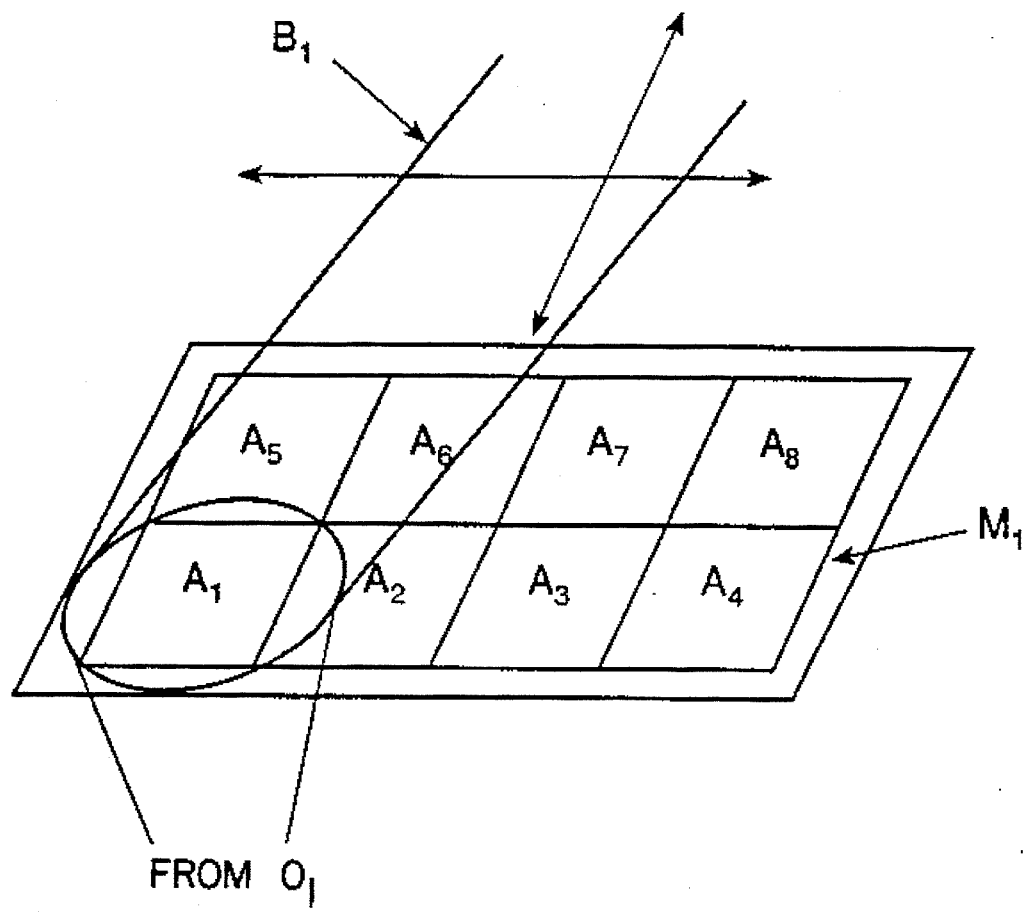
FIG. 3 is an schematic expanded view of one of the masks and adjacent substrate of FIG. 2 illustrating a mask with subapertures ablating openings in an underlying substrate, each of the subapertures containing computer generated holograms for forming ablating working images on the substrate when scanned by a laser beam.
Figure 3B:
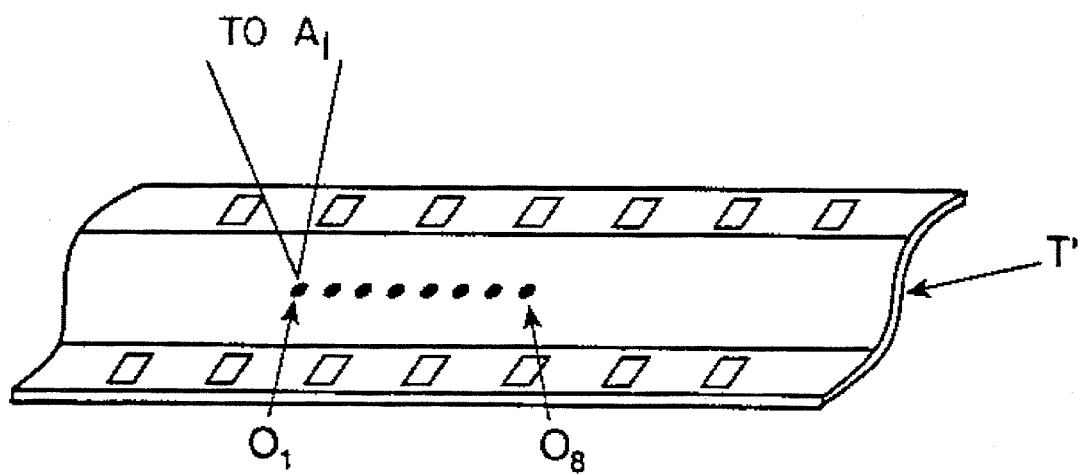

Referring to FIG. 3, the function of the apparatus and method of FIG. 2 can be understood. Collimated beam $B_1$ has been divided out from the original collimated beam from KrF excimer laser $L_1$. Mask $M_1$ contains a plurality of subapertures $A_1$–$A_8$. These respective subapertures when sequentially scanned by collimated beam $B_1$ produce successive working images to ablate openings $O_1$–$O_8$ in substrate T'.

We refer herein to the ability to adjust the intensity of an image profile with precision. Such adjustment is set forth in our co-pending application entitled USE OF FRESNEL ZONE PLATES FOR MATERIAL PROCESSING filed Jan. 3, 1994, this application being a Continuation-in-Part of Ser. No. 07/940,008 filed Sep. 3, 1992, which was a File Wrapper Continuation of Ser. No. 07/612,212 filed Nov. 9, 1990, now abandoned. This application is incorporated herein by reference.

Specifically, in that disclosure, we include two techniques for controlling image intensity in a holographic image with precision. The first of these techniques is feature width modulation. By utilizing two or more differing levels of optical elements and by varying the feature width substantially parallel to the grating period, image intensity or amplitude can be precisely controlled.

In a related portion of that application under the title of "chirping" we disclose a technique for the random interruption of grating fringes along their respective lengths. This random interruption uses a probability that again can control with relative precision the desired image amplitude.

The invention has been described in terms of a preferred embodiment. The invention, however, is not limited to the embodiment depicted and described. Rather, the scope of the invention is defined by the appended claims.

What is claimed is:

1. A process for ablating an opening, using a light source of known spectral composition, in a substrate to a particular design shape comprising the steps of:

providing a substrate of a material to be ablated at an upwardly exposed surface;

providing a mask with optical features forming at a working distance from the mask at least one working image for the opening responsive to incidence of light of known spectral composition, the working image having a profile required for ablating the opening to a particular design shape;

providing means for holding the mask at a working distance from the substrate to register the at least one working image to be incident to the substrate for forming the opening to the particular design shape on the substrate;

providing a light source of the known spectral composition and fluence for incidence to the mask for forming the working image;

determining a range of incident light fluences that causes the substrate to be ablated between a first fluence above which ablation occurs, and second fluences which cause ablations to various depths at various rates in the substrate;

selecting the profile of the opening to have a convex profile in the substrate tapering from a small slope adjacent the upwardly exposed surface of the substrate to an increasing slope within the substrate; providing the working image from the mask with a fluence profile above the first fluence for incidence on the substrate across the opening for ablating the substrate to the convex profile, the fluence profile registered to the substrate at the location of the opening;

the fluence profile of the working image including a small fluence above the first fluence at the small slope adjacent the upwardly exposed surface of the substrate where ablation ceases when the slope of the profile reaches the small slope, and the fluence profile of the working image including a larger fluence above the first fluence at the increasing slope interior of the aperture within the substrate where ablation ceases when the slope of the profile reaches the large slope;

causing the light source to be incident on the mask for a sufficient interval to cause the real working image formed from the mask to ablate the convex profile at the large slope.

2. A process for ablating an opening, using a light source, in a substrate to a particular shape according to claim 1 and further including the steps of:

the step of causing the light source to be incident on the mask includes the step of scanning the light source over the mask.

3. A process for ablating an opening, using a light source, in a substrate to a particular shape according to claim 1 and further including the steps of:

causing the light source of known spectral composition to be incident on the mask beyond the sufficient interval to cause the real working image formed from the mask to ablate to the boundaries of the convex profile of said particular design shape.

4. A process for ablating an opening, using a light source, in a substrate to a particular shape according to claim 1 and further including the steps of:

selecting the particular shape to include a concave profile in the substrate in addition to the convex profile;

providing the working image from the mask with a profile for ablating the substrate to the concave profile; and, causing the light source to be incident on the mask for a sufficient interval to cause the real working image formed from the mask to ablate to the boundaries of the concave profile of the particular design shape; and, ceasing the incidence of the light source on the mask when the particular design shape of the opening is attained in the substrate.

5. A process for ablating an opening, using a light source, in a substrate to a particular shape according to claim 1 and further including the steps of:

providing an imaging objective for relaying an image of the mask to a substrate.

6. A process for ablating an opening from a coherent beam of light in a substrate to a particular shape according to claim 1 comprising the further steps of:

providing a mask which is a computer generated hologram that directly projects a working image on the substrate without any need of intervening optics between the mask and the substrate.

7. A method of determining a working image having an ablation profile for ablating in a substrate at the surface an opening of designed shape comprising the steps of:

selecting the profile of the opening to have a convex profile in the substrate tapering from a small slope adjacent the surface of the substrate to an increasing slope within the substrate;

selecting the substrate;

selecting a light source of known spectral composition;

determining an ablation threshold for the substrate and a rate at which etching occurs above the ablation threshold as a function of fluence of the light source of known spectral composition upon the substrate;

providing means for generating a working image from the light source of known spectral composition with a fluence profile above the ablation threshold for incidence on the substrate across the opening for ablating the substrate to the convex profile, the fluence profile registered to the substrate at the location of the opening;

the fluence profile of the working image including a small fluence above the ablation threshold at the small slope adjacent the surface of the substrate where ablation ceases when the slope of the profile reaches the small slope, and the fluence profile of the working image including a larger fluence above the ablation threshold at the increasing slope interior of the opening within the substrate where ablation ceases when the slope of the profile reaches the large slope;

causing the light source of known spectral composition to be incident for a sufficient interval to cause the working image formed to ablate to the convex profile at the large slope.

8. A method of determining a working image having an ablation profile for ablating in a substrate an opening of designed shape according to claim 7 comprising the steps of:

providing a mask at a working distance from the substrate to generate the working image.

9. A mask for ablating an opening in an upwardly exposed surface of a substrate from a coherent beam of light of known frequency incident upon the mask, the opening being ablated to a particular shape, the mask including:

at least one aperture thereon containing optical features at the aperture on the mask to impart to the light of known frequency a working image intensity profile for the opening, the working image intensity profile chosen by the steps of:

selecting a profile of the opening to have a convex profile in the substrate tapering from a small slope adjacent the upwardly exposed surface of the substrate to an increasing slope within the substrate;

determining a range of incident light fluences that causes the substrate to be ablated between a first fluence above which ablation occurs, and second fluences which cause ablations to various depths at various rates in the substrate;

providing the working image from the aperture with a fluence profile having a fluence above the first fluence for incidence on the substrate across the opening for ablating the substrate to the convex profile, the fluence profile registered to the substrate at the location of the opening;

the fluence profile of the working image including a small fluence above the first fluence at the small slope adjacent the surface of the substrate where ablation ceases when the slope of the profile reaches the small slope, and the fluence profile of the working image including a larger fluence above the first fluence at the increasing slope interior of the aperture within the substrate where ablation ceases when the slope of the profile reaches the large slope.

10. A mask for ablating an opening from a coherent beam of light of known frequency and fluence incident upon the mask in a substrate at a working distance from the mask, the opening being ablated to a particular shape according to claim 9 and wherein the mask further includes:

means associated with the mask for causing the image of the opening to be relayed a working distance from the mask to a working image for ablating the substrate.

11. A mask for ablating an opening from a coherent beam of light of known frequency and fluence incident upon the mask in a substrate at a working distance from the mask, the opening being ablated to a particular shape according to claim 9 and wherein the mask further includes:

a plurality of subapertures.

12. An apparatus for ablating an opening, using a light source, in a substrate to a particular design shape comprising:

a substrate of a material to be ablated;

a mask with optical features forming at a working distance from the mask at least one working image for the opening responsive to the incidence of light of known spectral composition, the working image having a profile required for ablating the opening to a particular design shape;

means for holding the mask at a working distance from the substrate to register the at least one working image to be incident to the substrate for forming the opening to the particular design shape on the substrate;

a light source of the known spectral composition and fluence for incidence to the mask for forming the working image;

the light source including range of incident light fluences that cause the substrate to be ablated between a first fluence above which ablation occurs, and second fluences which cause ablations to various depths at various rates in the substrate;

the profile of the opening to have a convex profile in the substrate tapering from a small slope adjacent the surface of the substrate to an increasing slope within the substrate;

the working image from the mask with a fluence profile above the ablation threshold for incidence on the substrate across the opening for ablating the substrate to the convex profile, the fluence profile registered to the substrate at the location of the opening;

the fluence profile of the working image including a small intensity above the ablation threshold at the small slope adjacent the surface of the substrate where ablation ceases when the slope of the profile reaches the small slope, and the fluence profile of the working image including a larger intensity above the ablation threshold at the increasing slope interior of the aperture within the substrate where ablation ceases when the slope of the profile reaches the large slope;

means for causing the light source to be incident on the mask for a sufficient interval to cause the real working image formed from the mask to ablate to the boundaries of the convex profile at the large slope.

13. An apparatus for ablating an opening, using a light source, in a substrate to a particular shape according to claim 12 and further including:

the particular shape including a concave profile in the substrate;

the working image from the mask with a profile for ablating the substrate to the concave profile; and, means for causing the light source to be incident on the mask for a sufficient interval to cause the real working image formed from the mask to ablate to the boundaries of the concave profile of the particular design shape, and, means for ceasing the incidence of the light source on the mask when the particular design shape of the opening is attained in the substrate.

14. An apparatus for ablating an opening, using a light source, in a substrate to a particular shape according to claim 12 and further including:

means for holding a mask includes an imaging objective for relaying an image of the mask to a substrate.

15. An apparatus for ablating an opening, using a light source, in a substrate to a particular shape according to claim 12 and further including:

the mask is a computer generated hologram that directly projects a working image on the substrate without any need of intervening optics between the mask and the substrate.

16. An apparatus for ablating an opening, using a light source, in a substrate to a particular shape according to claim 12 and further including:

means for scanning the light source over the mask.

17. An apparatus for ablating an opening, using a light source, in a substrate to a particular shape according to claim 12 and further including:

the light source including polychromatic light.

18. An apparatus for ablating an opening, using a light source, in a substrate to a particular shape according to claim 12 and further including:

the mask includes an imaging system.

19. An apparatus for ablating an opening, using a light source, in a substrate to a particular shape according to claim 12 and further including:

the mask includes a computer generated hologram.

* * * * *